(12) United States Patent
 Grossblatt et al.

(10) Patent No.: US 9,978,098 B1
(45) Date of Patent: May 22, 2018

(54) PROACTIVE PAYROLL SUPPORT

(75) Inventors: Lesley Kim Grossblatt, San Francisco, CA (US); Yogesh K. Bhumralkar, San Francisco, CA (US); Sandra M. Edwards, Sunnyvale, CA (US); Eric E. Shenk, Mountain View, CA (US)

(73) Assignee: Intuit Inc., Mountain View, CA (US)

(*) Notice: Subject to any disclaimer, the term of this patent is extended or adjusted under 35 U.S.C. 154(b) by 1408 days.

(21) Appl. No.: 12/871,793

(22) Filed: Aug. 30, 2010

(51) Int. Cl.
 *G06Q 40/00* (2012.01)
 *G06Q 40/02* (2012.01)

(52) U.S. Cl.
 CPC ............. *G06Q 40/02* (2013.01); *G06Q 40/00* (2013.01)

(58) Field of Classification Search
 CPC ............................. G06Q 40/125; G06Q 40/02
 See application file for complete search history.

(56) References Cited

U.S. PATENT DOCUMENTS

| | | | | |
|---|---|---|---|---|
| 7,024,389 B1* | 4/2006 | Watkins | ................. | G06Q 40/02 705/40 |
| 8,036,960 B2* | 10/2011 | Dean | ..................... | G06Q 10/10 705/30 |
| 2003/0074311 A1* | 4/2003 | Saylors | .................. | G06Q 40/02 705/39 |
| 2003/0097342 A1* | 5/2003 | Whittingtom | .......... | G06Q 10/10 705/75 |
| 2004/0049436 A1* | 3/2004 | Brand | .................... | G06Q 40/12 705/30 |
| 2010/0057597 A1* | 3/2010 | Vilrokx | .......................... | 705/32 |
| 2010/0211485 A1* | 8/2010 | Augustine | ............. | G06Q 10/00 705/32 |

OTHER PUBLICATIONS

Robert F. Danbeck, The Federal Flexible Spending Account Program (FSAFEDS): Transfer of Funds between the Two Types of Flexible Spending Accounts, Sep. 14, 2006, Office of Personnel Management, web, 2-4 (Year: 2006).*

* cited by examiner

*Primary Examiner* — I Jung Liu
(74) *Attorney, Agent, or Firm* — FBFK PC (57) ABSTRACT

A method for correcting a payroll error in a payroll of an employee includes calculating a value range of a payroll component based on the payroll of the employee for a pre-determined number of prior payroll periods, comparing a current value of the payroll component for a current payroll period and the value range to generate a difference, identifying an irregularity parameter associated with the payroll component in response to the difference exceeding a pre-determined threshold, wherein the irregularity parameter relates to a pre-determined mechanism capable of causing the payroll error, analyzing the difference using a pre-determined rule based on the irregularity parameter to determine whether the payroll error exists, and in response to determining that the payroll error exists, correcting the payroll error prior to releasing the payroll for the current payroll period.

17 Claims, 8 Drawing Sheets

PROACTIVE PAYROLL SUPPORT

BACKGROUND

For small business employers who typically don't have human resource departments, payroll can be a very complex and stressful activity. When payrolls are always the same, employers feel less stress because once they figure out what is happening with the payroll, the predictability of seeing the same payroll numbers every time leads to less confusion and stress. But when things change in the payroll, especially non-obvious changes such as a change in tax withholding rate, employers become stressed out because they often lack the payroll expertise to understand why changes happened. However, it takes a lot of time to constantly examine each payroll, so most employers don't pay attention until problems have already occurred causing even more cost and headaches for the small business owner.

Preventable payroll errors cause millions of dollars in unnecessary expenses for small business owners (SBO's) who have to sort out and correct problems, which often get resolved after payroll is released and money moved out of the small business owner's bank accounts.

SUMMARY

In general, in one aspect, the invention relates to a method for correcting a payroll error in a payroll of an employee. The method includes calculating, using a processor of a server computer, a first value range of a payroll component based on the payroll of the employee for a pre-determined number of prior payroll periods, comparing, using the processor, a current value of the payroll component for a current payroll period and the value range to generate a first difference, identifying an irregularity parameter associated with the payroll component in response to the first difference exceeding a pre-determined first threshold, wherein the irregularity parameter relates to a pre-determined mechanism capable of causing the payroll error, analyzing, using the processor, the first difference using a pre-determined rule based on the irregularity parameter to determine whether the payroll error exists, and in response to determining that the payroll error exists, correcting the payroll error prior to releasing the payroll for the current payroll period.

In general, in one aspect, the invention relates to a system for correcting a payroll error in a payroll of an employee. The system includes a processor and a payroll change calculator executing on the processor and configured to calculate a first value range of a payroll component based on the payroll of the employee for a pre-determined number of prior payroll periods and compare a current value of the payroll component for a current payroll period and the value range to generate a first difference. The system also includes a payroll difference analyzer executing on the processor and configured to identify an irregularity parameter associated with the payroll component in response to the first difference exceeding a pre-determined first threshold, wherein the irregularity parameter relates to a pre-determined mechanism capable for causing the payroll error and analyze the first difference using a pre-determined rule based on the irregularity parameter to determine whether the payroll error exists. The system further includes a payroll correction module executing on the processor and configured to in response to determining that the payroll error exists, correct the payroll error prior to releasing the payroll for the current payroll period.

In general, in one aspect, the invention relates to a computer readable storage medium embodying instructions executable by a computer to correct a payroll error in a payroll of an employee. The instructions, when executed by the computer includes functionality for calculating a first value range of a payroll component based on the payroll of the employee for a pre-determined number of prior payroll periods, comparing a current value of the payroll component for a current payroll period and the value range to generate a first difference, identifying an irregularity parameter associated with the payroll component in response to the first difference exceeding a pre-determined first threshold, wherein the irregularity parameter relates to a pre-determined mechanism capable of causing the payroll error, analyzing the first difference using a pre-determined rule based on the irregularity parameter to determine whether the payroll error exists, and in response to determining that the payroll error exists, correcting the payroll error prior to releasing the payroll for the current payroll period.

Other aspects of the invention will be apparent from the following detailed description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for a system and method for proactive payroll support that automates the process of determining customized thresholds used to detect significant differences in payrolls to alert employers quickly and easily regarding a potential problem based on their own unique payroll data and patterns. For example, an automated software program would be configured to regularly review a small business's payroll data and patterns to establish customized expected value ranges for the particular payroll data that are compared against current period payroll data as it is entered.

In one or more embodiments, the expected value range for each dynamic numerical value associated with the payroll (referred to as a payroll component, such as hours worked, monthly taxes withheld, etc.) is established based on an algorithm that considers standard deviation and historical minimum/maximum of the payroll component values (e.g., employee A has never had less than 10 or more than 50 work hours in a payroll period).

In one or more embodiments, the expected value range for each payroll component is established based on an algorithm that considers statistical patterns based on historical data (e.g., employee B usually adds 20 additional work hours for the last pay period of each month).

In one or more embodiments, a custom "expected value range" may be established for a particular employee/payroll component combination through his/her account settings (e.g., a salesperson employee may have a highly variable schedule of 0-100 work hours per payroll period).

In one or more embodiments, the expected value ranges may be filtered against an applicable payroll-specific rule, for example related to a change in withholding rate or a wage limit being reached.

In one or more embodiments, a payroll component value in the current period payroll is compared against the expected value range for each payroll component when new payroll data is entered. If the value entered in the new payroll is outside of the corresponding expected value range, an alert is generated and sent to the employer.

Figure 1A:
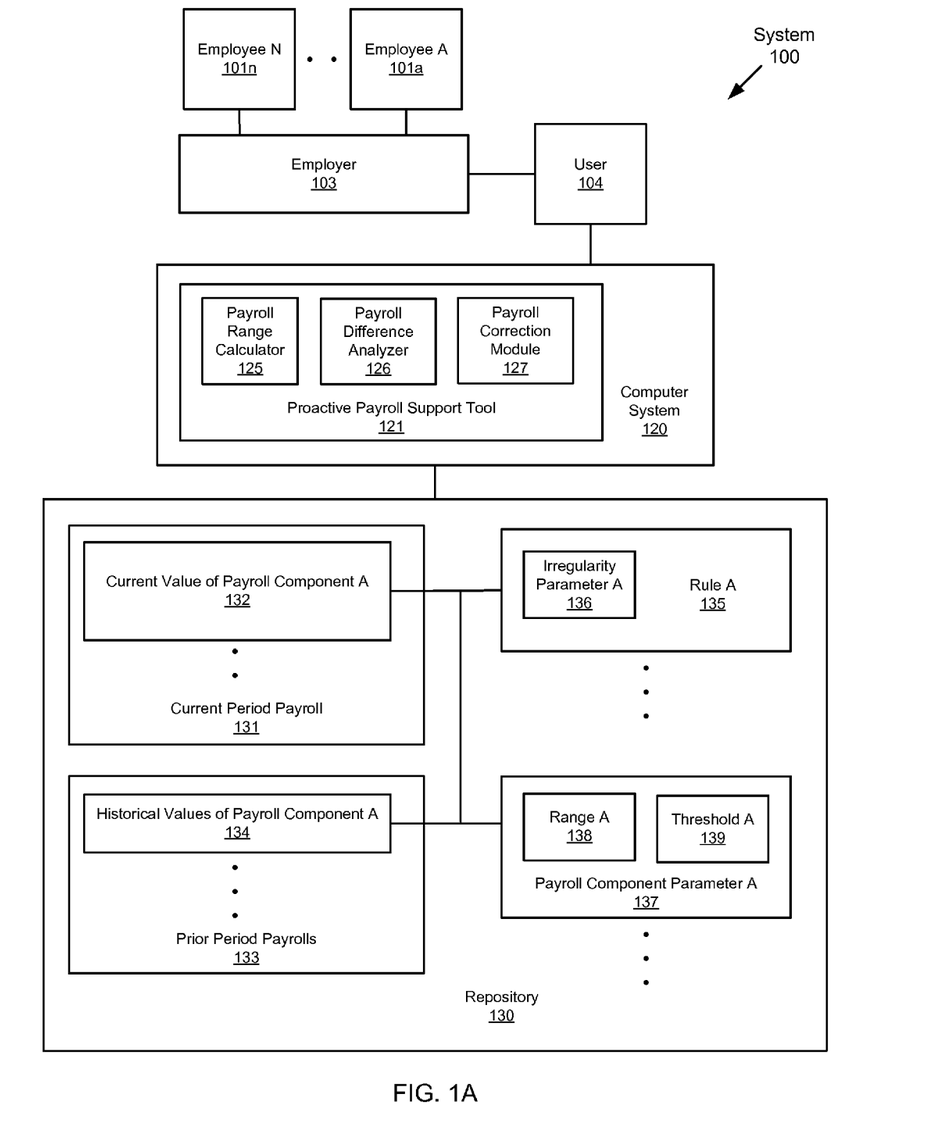
FIGS. 1A and 1B show block diagrams of a system in accordance with one or more embodiments of the invention.

FIG. 1A depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1. The system (100) of FIG. 1 depicts the components of a proactive payroll support tool in accordance with embodiments disclosed herein. Each of these components is described in detail below.

As shown in FIG. 1A, the system (100) may include a computer system (120) installed with a proactive payroll support tool (121) and an employer (103) having employees (e.g., employee A (101a), employee N (101n), etc.). As shown, the proactive payroll support tool (121) includes a payroll range calculator (125), a payroll difference analyzer (126), and a payroll correction module (127) in accordance with one or more embodiments of the invention. In addition, the system (100) includes a user (104) who is designated by the employer (103) to use the computer system (120) in accordance with one or more embodiments of the invention. Further, the user (104) may include a computing device (not shown) for accessing the computer system (120) and the functionalities of the proactive payroll support tool (121). In particular, the user (104) may access the computer system (120) via a network (not shown) that may be the Internet, a wide area network, a local area network, WIFI, or any other suitable wired or wireless network.

Furthermore, the system (100) includes a repository (130) coupled to the computer system (120) in accordance with one or more embodiments of the invention. The repository (130) may be a database, persistent storage, computer memory, or any other suitable type of storage device. The repository stores payroll data including a current period payroll (131) and a prior period payrolls (133) based on a set of payroll components each having a current value (e.g., the current value of payroll component A (132)) and a historical values (e.g., the historical values of payroll component A (134)) and is associated with a pre-determined rule (e.g., rule A (135) having irregularity parameter A (136)) and a payroll component parameter (e.g., payroll component parameter A (137) including range A (138) and threshold A (139)) in accordance with one or more embodiments of the invention.

In one or more embodiments, the current period payroll (131) includes a set of current value of payroll components (e.g., current value of payroll component A (132)) while the prior period payrolls (133) includes a corresponding set of historical values of payroll components (e.g., historical value of payroll component A (132)). The current value of payroll component A (132) and the corresponding historical values of payroll component A (134) are together referred to as associated with the payroll component A (described in reference to FIG. 1B below). In one or more embodiments, the current period payroll is organized in the structure (which could be any data structure suitable for storing data) depicted in FIG. 1B as a period payroll (150). In one or more embodiments, a prior period payrolls (133) includes a number of period payrolls (described in reference to FIG. 1B below) each corresponding to one of a number of prior payroll periods (not shown) while each of the number of period payrolls is organized in the structure depicted in FIG. 1B as the period payroll (150). For example, the current payroll period may be August 2010, the current period payroll (150) may be the August 2010 payroll, the prior period payrolls (133) may include July 2010 payroll, June 2010 payroll, May 2010 payroll, April 2010 payroll, etc. Further, each of the August 2010 payroll, July 2010 payroll, June 2010 payroll, May 2010 payroll, April 2010 payroll, etc. is organized in the structure of the period payroll (150) depicted in FIG. 1B.

Figure 1B:
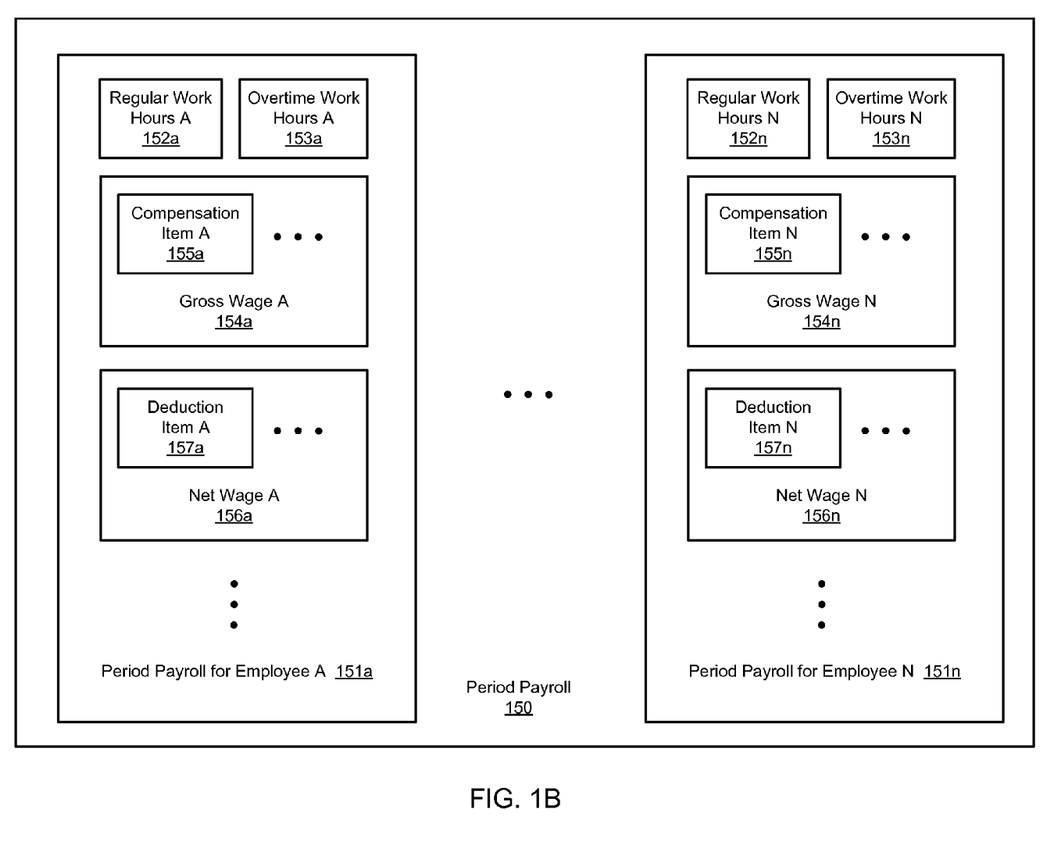

FIG. 1B shows a diagram of an example period payroll (150), which again could be any data structure capable of storing data in accordance with one or more embodiments of the invention. As shown, the period payroll (150) includes a period payroll for employee A (151a), a period payroll for employee N (151n), etc. each corresponding to one of the employees (e.g., employee A (101a), employee N (101n), etc.) of the employer (103) in accordance with one or more embodiments of the invention. In one or more embodiments, the period payroll for employee A (151a) includes a number of payroll components such as regular work hours A (152a), overtime work hours A (153a), a gross wage A (154a), a net wage A (156a), etc. each having a value specific to the employee A (101a). In addition, the payroll component gross wage A (154a) includes multiple compensation items (e.g., compensation item A (155a), etc.) and the payroll component net wage A (156a) includes multiple compensation items (e.g., compensation item A (155a), etc.) includes multiple deduction items (e.g., a deduction item A (157a), etc.). For example, the compensation item A (155a) may be one of regular salary, bonus, commission, etc. while the deduction item A (157a) may be one of federal withholding, state withholding, social security tax, etc. in accordance with one or more embodiments of the invention. Similarly, the period payroll for employee N (151n) includes similar types of payroll components such as regular work hours N (152n), overtime work hours N (153n), a gross wage N (154n), a net wage N (156n), etc. each having a value specific to the employee N (101n) in accordance with one or more embodiments of the invention.

Throughout this disclosure, each of the regular work hours A (152a), the overtime work hours A (153a), the gross wage A (154a), the net wage A (156a), the compensation item A (155a), the deduction item A (157a), the regular work hours N (152n), the overtime work hours N (153n), the gross wage N (154n), the net wage N (156n), the compensation item N (155n), the deduction item N (157n), etc. is referred to as a payroll component. Further, each payroll component may have a current value (e.g., current value of payroll component A (132)) and multiple historical values (e.g., historical values of payroll component A (134)) as shown in FIG. 1A. For example, the payroll component A may be the regular work hours A (152a) of employee A (101a), the current payroll period may be August 2010, the current value of the payroll component A may be the regular work hours of the employee A (101*a*) during August 2010, the historical values of the payroll component A may include the regular work hours of the employee A (101*a*) during each of July 2010 payroll, June 2010 payroll, May 2010 payroll, April 2010 payroll, etc.

As noted above in reference to FIG. 1A, the payroll component A (e.g., one of regular work hours A (152*a*), the overtime work hours A (153*a*), the gross wage A (154*a*), the net wage A (156*a*), the compensation item A (155*a*), the deduction item A (157*a*), the regular work hours N (152*n*), the overtime work hours N (153*n*), the gross wage N (154*n*), the net wage N (156*n*), the compensation item N (155*n*), the deduction item N (157*n*), etc. shown in FIG. 1B) is associated with the current value of payroll component A (132) and the historical values of payroll component A (134).

As shown in FIG. 1 A, the historical values of payroll component A (134) is associated with payroll component parameter A (137) including range A (138) and threshold A (139). For example, the payroll component A may be the regular work hours A (152*a*) of employee A (101*a*), the range A (138) may be the range of statistical distribution of the regular work hours of the employee A (101*a*) during July 2010 payroll, June 2010 payroll, May 2010 payroll, April 2010 payroll, etc. In one or more embodiments, the range A (138) includes a high end and a low end of a range defined by maximum/minimum values of such statistical distribution, one standard deviation of such statistical distribution, two standard deviations of such statistical distribution, or any other number of standard deviations of such statistical distribution. In one or more embodiments, only one of the high/low ends of the range A (138) is calculated while the other end of the range A (138) is a default number (e.g., the high end is calculated while the low end is defaulted to 0). In one or more embodiments, the threshold A (139) is an acceptable deviation for the current value of payroll component A (132) to lay outside of the range A (138) without being considered as indicative of an payroll error.

Further, as shown in FIG. 1A, the current value of payroll component A (132) is associated with a pre-determined rule A (135) based on the irregularity parameter A (136), which are described in more details below.

In one or more embodiments of the invention, the proactive payroll support tool (121) or a portion thereof is a stand alone software operatively connected and able to communicate with a payroll application (not shown), a user installable add-on module of the payroll application (not shown), an optional functional module within the payroll application (not shown), or a standard feature built-in within the payroll application (not shown). In one or more embodiments of the invention, the third proactive payroll support tool (121) may be provided by a provider of the payroll application (not shown) or by a third party separate from the provider of the payroll application (not shown). One example of the payroll application may include Intuit Online Payroll offered by Intuit Inc., Mountain View, Calif.

In one or more embodiments of the invention, the computer system (120) may be operated by the user (104) for accessing functionalities of the proactive payroll support tool (121). In one or more embodiments, the computer system (120) may be operated by an application service provider using which the user (104) may access the functionalities of the proactive payroll support tool (121). The computer system may be any computing device suitable for hosting the proactive payroll support tool (121), such as, for example, a server computer, a thin computer, a laptop, a desktop system, a hand-held computing device such as a smart phone or any other suitable computing device.

In one or more embodiments of the invention, the proactive payroll support tool (121) includes the payroll range calculator (125) that is configured to calculate a range (e.g., range A (138)) of a payroll component (e.g., payroll component A, such as one of regular work hours A (152*a*), overtime work hours A (153*a*), gross wage A (154*a*), net wage A (156*a*), compensation item A (155*a*), deduction item A (157*a*), regular work hours N (152*n*), overtime work hours N (153*n*), gross wage N (154*n*), net wage N (156*n*), compensation item N (155*n*), deduction item N (157*n*), etc.) based on the payroll of the employee (e.g., period payroll for employee A (151*a*)) for a pre-determined number (e.g., two, three, four, or any other number) of prior payroll periods (e.g., weekly payroll period, bi-weekly payroll period, monthly payroll period, quarterly payroll period, etc.). In one or more embodiments, the range A (138) is calculated based on statistical distribution of the historical values of payroll component A (134). As noted above, such calculation may be based on maximum/minimum values of such statistical distribution, one standard deviation of such statistical distribution, two standard deviations of such statistical distribution, or any other number of standard deviations of such statistical distribution. For example, the range A (138) may include a high end of the range and a low end of the range corresponding to the maximum value and the minimum value, respectively, of the statistical distribution. In another example, the range A (138) may include a high end of the range and a low end of a range corresponding to a mean value of the statistical distribution plus and minus, respectively, a number (e.g., one, two, three, or any other number) of standard deviations.

In one or more embodiments, the payroll range calculator (125) is further configured to compare a current value of the payroll component for a current payroll period (e.g., current value of payroll component A (132)) and the value range (e.g., range A (138)) to generate a difference, which will be used by the payroll difference analyzer (126) to perform analysis. For example, the current value of payroll component A (132) may exceed the high end of the range A (138) by the difference or may be less than the low end of the range A (138) by the difference. In particular, the difference is zero if the current value of payroll component A (132) lies within the high end and low end of the range A (138).

In one or more embodiments of the invention, the proactive payroll support tool (121) includes the payroll difference analyzer (126) that is configured to identify an irregularity parameter (e.g., irregularity parameter A (136)) associated with the payroll component (e.g., payroll component A, such as one of regular work hours A (152*a*), overtime work hours A (153*a*), gross wage A (154*a*), net wage A (156*a*), compensation item A (155*a*), deduction item A (157*a*), regular work hours N (152*n*), overtime work hours N (153*n*), gross wage N (154*n*), net wage N (156*n*), compensation item N (155*n*), deduction item N (157*n*), etc.) in response to the aforementioned difference exceeding a pre-determined threshold (e.g., threshold A (139)). In one or more embodiments, the irregularity parameter (e.g., irregularity parameter A (136)) relates to a pre-determined mechanism capable for causing a payroll error (not shown). For example, the payroll component A may be the regular work hours A (152*a*) of employee A (101*a*), the irregularity parameter A (136) may be time at current position of the employee A (101*a*), which may be identified when the current value of payroll component A (132) lies outside of the range A (138) by more than the threshold A (139). More details and examples of the irregularity parameter are described in reference to FIGS. 3A-3D below.

In one or more embodiments, the payroll difference analyzer (126) is further configured to analyze the difference using a pre-determined rule (e.g., rule A (135)) based on the irregularity parameter (e.g., irregularity parameter A (136)) to determine if the payroll error (not shown) exists. For example, the payroll component A may be the regular work hours A (152a) of employee A (101a), the irregularity parameter A (136) may be time at current position of the employee A (101a), the rule A (135) may dictate to adjust the difference by recalculating the range A (138) based on industry statistics and company statistics associated with a job classification of the employee A (101a) instead of based on historical values of work hours of employee A (101a). More details and examples of the pre-determined rule are described in reference to FIGS. 3A-3D below.

In one or more embodiments of the invention, the proactive payroll support tool (121) includes the payroll correction module (127) that is configured to correct, in response to determining that the payroll error (not shown) exists, the payroll error (not shown) prior to releasing the payroll for the current payroll period (e.g., current period payroll (131)). More details and examples of determining and correcting the payroll error (not shown) are described in reference to FIGS. 3A-3D below.

Figure 2:
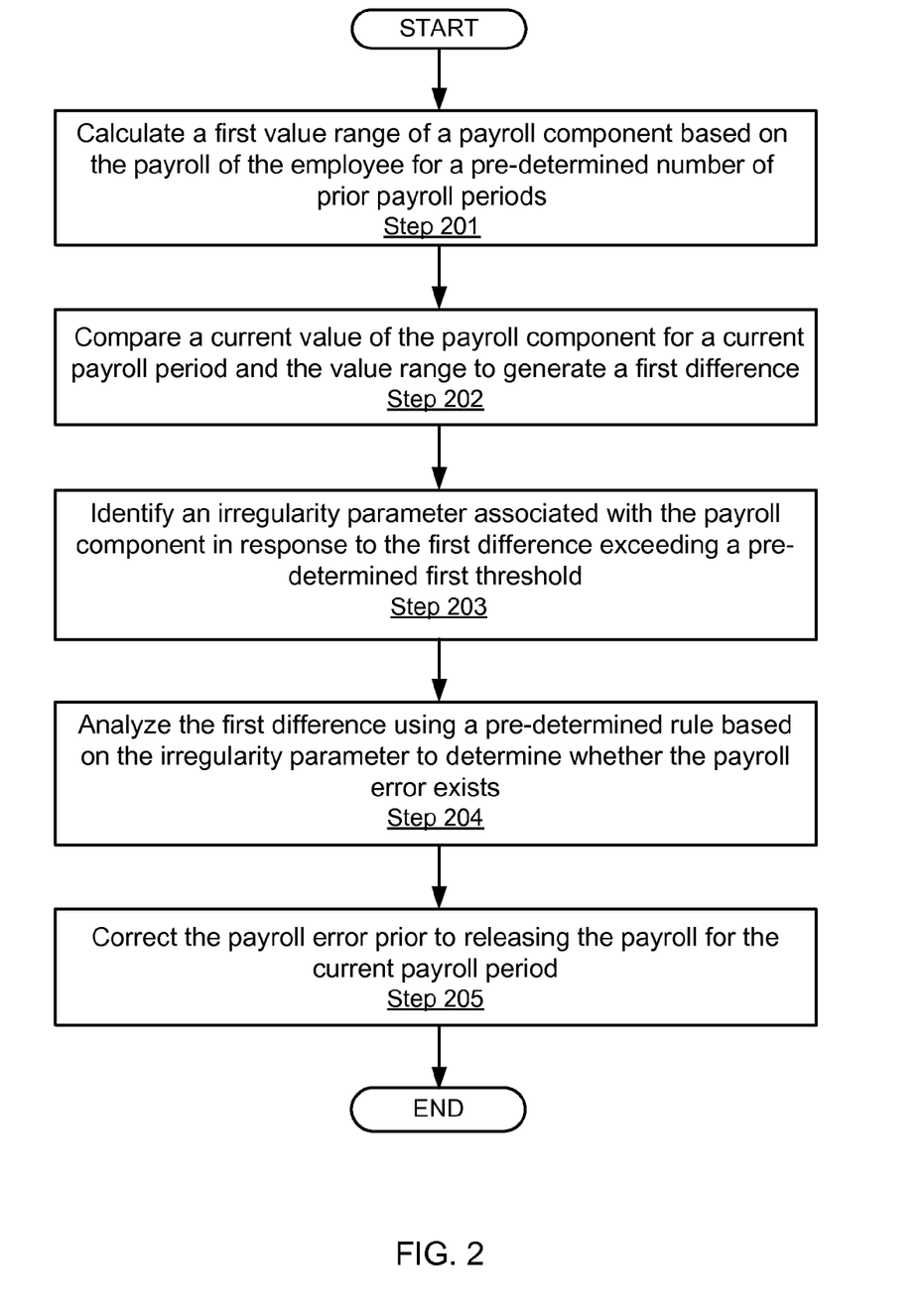
FIG. 2 shows a flowchart of a method in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2.

Initially in Step 201, a range of a payroll component is calculated based on the payroll of the employee for a pre-determined number of prior payroll periods in accordance with one or more embodiments of the invention. For example, such prior period payroll of the employee may be obtained from a payroll application. In or more embodiments, the range is a statistical measure of the spread of the payroll component value throughout the prior payroll periods. In particular, the values of the payroll component throughout such prior payroll periods during a pre-determined time period form a statistical distribution. In one or more embodiments, the value range is defined by a high end and a low end of a range calculated based on a statistical formula. For example, regular work hours of an employee during a number of prior payroll periods form a statistical distribution from which a statistical range is calculated. In particular, the statistical range may be defined using statistical formula known to those skilled in the art. In one or more embodiments, only one of the high/low ends of the value range is calculated while the other end of the value is a default number (e.g., the high end of the regular work hours is calculated while the low end of the regular work hours is defaulted to 0).

In Step 202, a current value of the payroll component for a current payroll period and the value range are compared to generate a difference in accordance with one or more embodiments of the invention. For example, such current period payroll of the employee may be obtained from the payroll application. In one or more embodiments, the difference is zero if the current value lies within the range while the difference otherwise equals the amount by which the current value lies outside of the range. For example, if the range of the regular work hours of the employee is from 70 hours to 90 hours based on last 12 payroll period and the current regular work hours of the employee in the current payroll period is 95 hours, the difference is then calculated to be 95−90=5 hours.

In Step 203, an irregularity parameter associated with the payroll component is identified in response to the difference exceeding a pre-determined threshold in accordance with one or more embodiments of the invention. For example, if the threshold is 2 hours and the difference is 5 hours, such difference exceeding the threshold is considered as indicative of a possible payroll error. In one or more embodiments, the irregularity parameter is identified in such condition as being related to a pre-determined mechanism capable of causing the possible payroll error. For example, the irregularity parameter may be time on the current position of the employee. In particular, a new employee may not have a meaningful statistical distribution in regular work hours. Accordingly, the time on the current position of the employee is considered as a relevant parameter related to payroll error based on incorrect regular work hours. More details and examples of the irregularity parameter are described in reference to FIGS. 3A-3D below.

In Step 204, the difference is analyzed using a pre-determined rule based on the irregularity parameter to determine whether the payroll error exists in accordance with one or more embodiments of the invention. For example, if the time on the current position (i.e., the irregular parameter) indicates that the employee is new on the current position, the pre-determined rule dictates the value range to be recalculated based on industry statistics and company statistics associated with a job classification of the employee instead of based on historical values of work hours of the employee who is new on the job without relevant regular work hour statistics. Accordingly, the difference is adjusted based on the recalculated value range and analyzed to determine whether the payroll error exists. More details and examples of the pre-determined rule are described in reference to FIGS. 3A-3D below.

In Step 205, the payroll error is corrected, in response to determining that the payroll error exists, prior to releasing the payroll for the current payroll period in accordance with one or more embodiments of the invention. For example, if the current work hours still deviate from the range recalculated in Step 204 by an amount (i.e., the adjusted difference) exceeding the threshold, it is then determined that the payroll error does exist. More details and examples of determining and correcting the payroll error (not shown) are described in reference to FIGS. 3A-3D below.

FIGS. 3A-3D depict screen shots of an application example in accordance with one or more embodiments of the invention. This example application may be practiced using the system (100) of FIG. 1 and based on the method described with respect to FIG. 2 above.

Figure 3A:
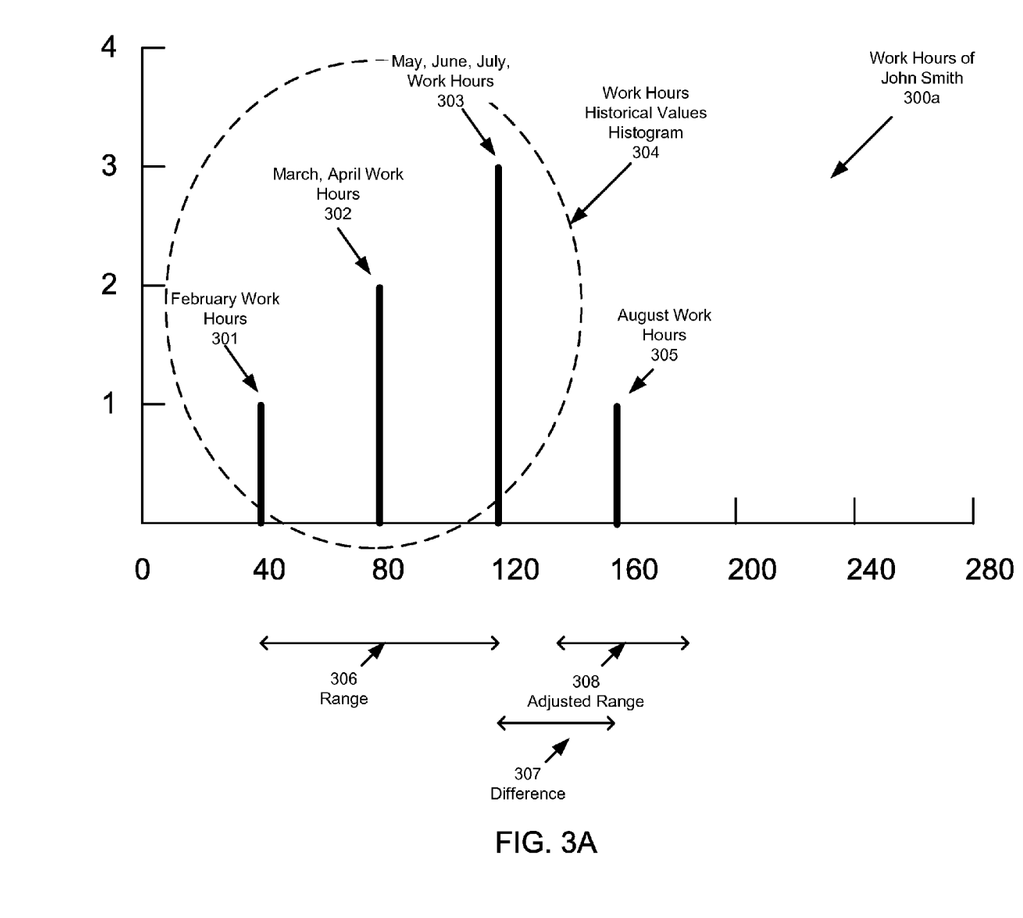
FIGS. 3A through 3D show examples of user contributed marketing decision tool in accordance with one or more embodiments of the invention.

FIG. 3A shows a statistical distribution plot (300a) of the payroll component "work hours of employee John Smith" based on past six monthly payrolls (i.e., February through July) as well as the current monthly payroll (i.e., August) for John Smith. As shown in the work hours historical values histogram (304) where the x-axis represents monthly work hours and y-axis represents count, John worked 40 hours in February, 80 hours for each of March and April, 120 hours for each of May, June, and July. Accordingly, the value range (306) is calculated as 40 hours to 120 hours using the maximum/minimum values of the histogram. Further as shown in FIG. 3A, John worked 160 hours in August. Therefore, the current monthly work hours lies outside of the range (306) and the difference (307) between the current monthly work hours (305) and the range (306) is calculated to be 40 hours (e.g., 160−120=40). In the example shown in FIG. 3A, the threshold for determining a possible payroll error is set as 15 hours and the irregularity parameter is the time at the current position of the employee John Smith. Because the difference (307) is 40 hours, which exceeds the threshold of 15 hours, the difference (307) is analyzed based on the irregularity parameter. It turns out that John's time at the current position is 8 months indicating John is a new employee with less than one year of tenure on the job while the rule associated with John's job classification "temp-to-perm (i.e., starting with temporary status turning into permanent position) accounting clerk" dictates that industry and company statistics should be used to calculate the adjusted range (308) of monthly work hours instead of using historical work hours (i.e., work hours historical values histogram (304)) of John. Based on the industry and company statistics of temp-to-perm accounting clerk with 8 month tenure, the adjusted range (308) of monthly work hours is 140 hours to 180 hours. Since John's work hours for August is 160 hours and lies within the adjusted range (308), the proactive payroll support tool automatically determines that the August payroll does not have an error regarding the work hours. Therefore no alert is generated for problem resolution and the August payroll is released as is.

Figure 3B:
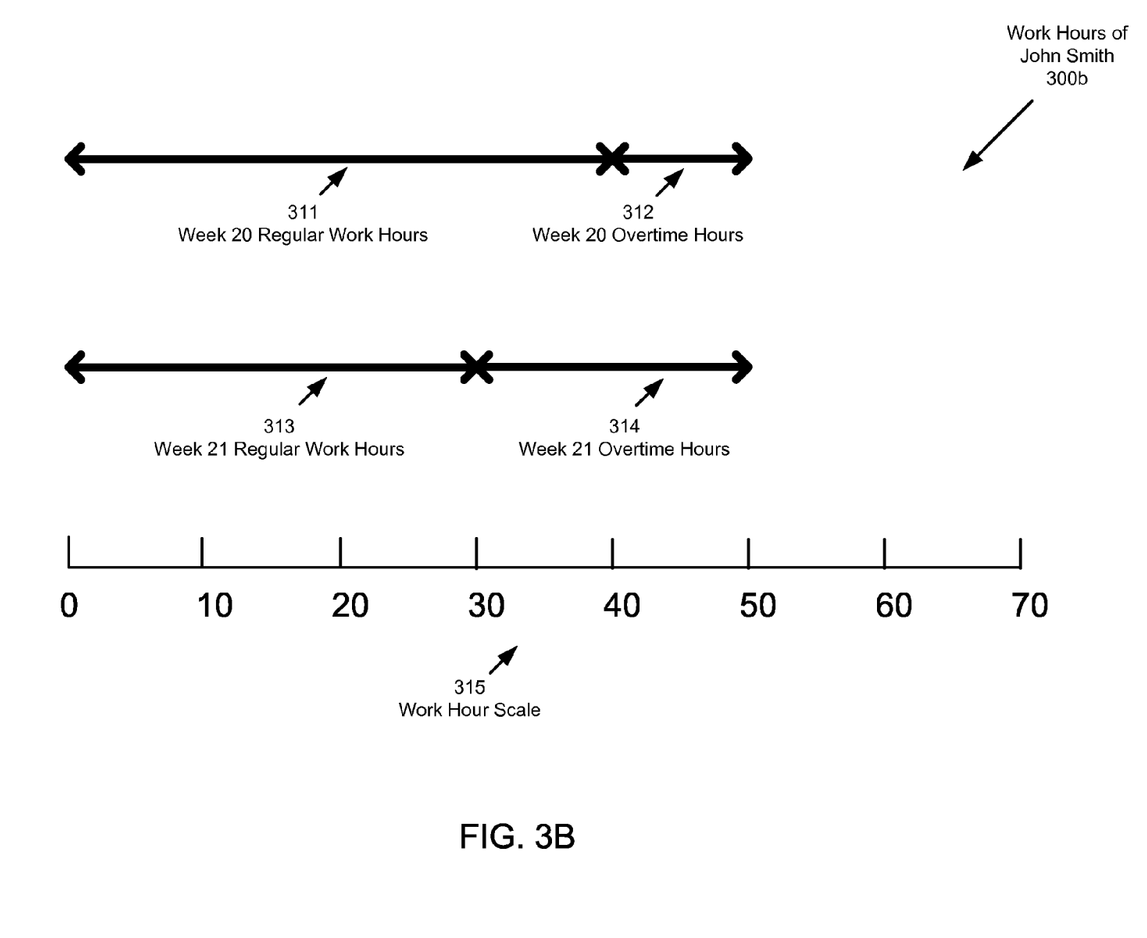

FIG. 3B shows a chart of work hours for employee John Smith (300b) based on a work hour scale (315) in accordance with one or more embodiments of the invention. In the example shown in FIG. 3B, the payroll component is overtime hours (e.g., week 20 overtime hours (312), week 21 overtime hours (314)) while the irregularity parameter is the allocation between overtime hours and regular hours (e.g., week 20 regular work hours (311), week 21 regular work hours (313)). In addition, the value range of payroll component "overtime hours" is determined based on a single prior period payroll. Said differently, the payroll component value difference is calculated based on consecutive payroll periods. As shown, John reported 10 overtime hours for week 20 and 20 overtime hours for week 21. The overtime entries for consecutive payroll periods (i.e., weekly payroll) differ by a 100 percent increase, which is more than a pre-determined 10 percent threshold, thus a possible payroll error is indicated. In this situation, the rule associated with the overtime payroll component dictates that the allocation between the reported regular work hours and the overtime hours should be examined with respect to state requirement to confirm whether the payroll error exists. Upon an automatic analysis by the proactive payroll support tool, it turns out that John has mistakenly allocated only 30 hours (out of the total 50 work hours) to his regular work hours reported for week 21, which is below the 40 hours state requirement of weekly regular work hour limit after which overtime commences. Accordingly, an alert is automatically generated to the user and the work hour entries are automatically corrected by the proactive payroll support tool to re-allocate the 50 total work hours reported for week 21 into 40 regular work hours and 10 overtime hours. Based on configurable settings, such a correction may also be presented to one or more users for final approval. In one or more embodiments, the corrected payroll for the current week 21 is released after the user approves the correction.

Figure 3C:
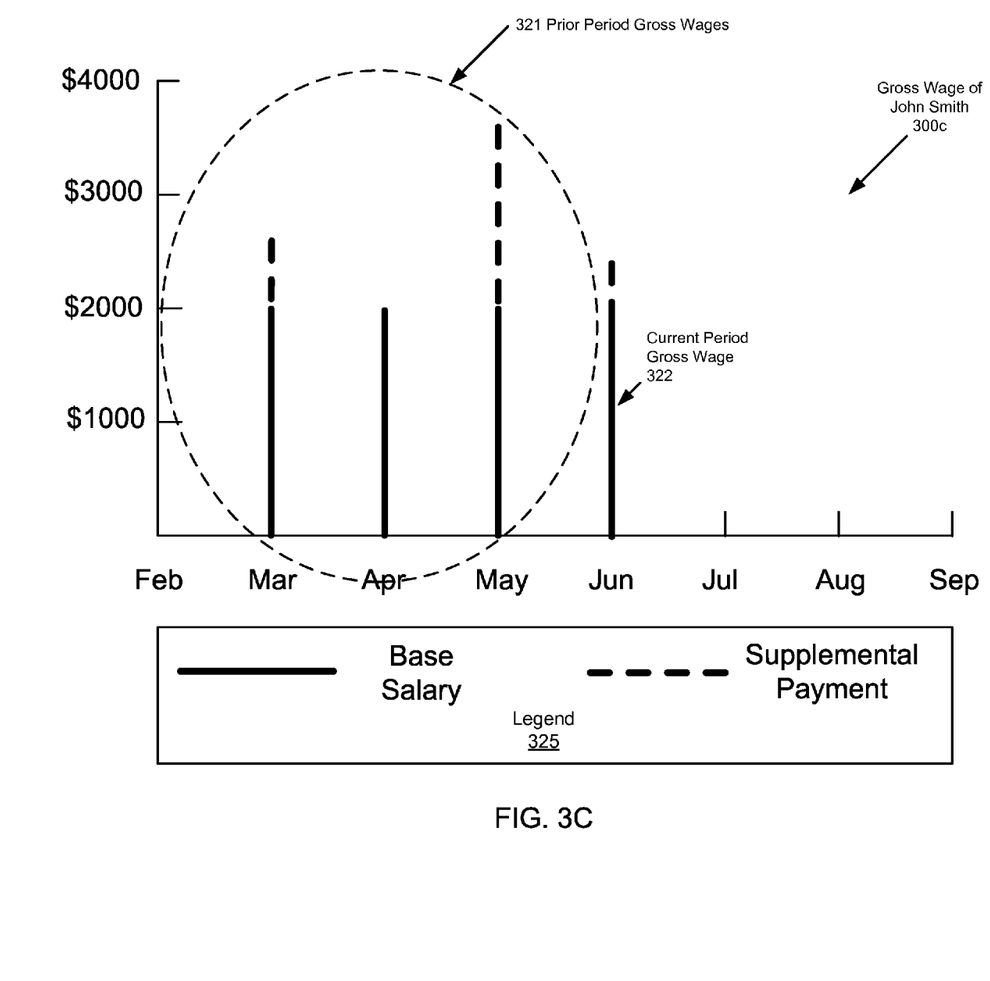

FIG. 3C shows a chart of gross wage for employee John Smith (300c) charting the payroll component "gross wage" based on the most recent four monthly payrolls (i.e., March through June) where the current value of the payroll component is the current period gross wage (322) (i.e., John Smith's gross wage for June). In particular, the gross wage is shown to include two compensation items, namely a base salary and a supplemental payment as depicted by the legend (325) shown in FIG. 3C.

In the example shown in FIG. 3C, the irregularity parameter is a type of the compensation item. For example, the type of the compensation item "supplemental payment" may be a bonus, commission, etc. Further, the value range of the payroll component "gross wage" is determined based on a single prior period payroll. Said differently, the payroll component difference is calculated based on consecutive payroll periods. As shown, John's gross wages are $2500 for March, $2000 for April, and $3600 for May within the prior period gross wages (321). Further, John's gross wages for the current month of June is $2400 (i.e., the current period gross wage (322)). The gross wage for consecutive payroll periods (i.e., monthly payroll) differs by a one third decrease, which is more than a pre-determined 10 percent threshold, thus a possible payroll error is indicated. The rule associated with the payroll component "gross wage" dictates that a type of compensation item needs to be examined to confirm whether the payroll error does exist.

Based on an automatic analysis by the proactive payroll support tool, a determination is made that an adjusted range based on the supplemental payment in the gross wage over at least three monthly payroll periods should be used for calculating the payroll component difference instead of using the range of the gross wage itself in a single payroll period. The adjusted range is then calculated automatically to be a $0 to $1600 bonus payment. Because the bonus payment for the current month of June is $400, which is within the adjusted range, a determination is automatically made by the proactive payroll support tool that there is no error in the current payroll. Therefore, no alert is generated for problem resolution and the June payroll is released as-is.

Although the example described above relates to the type of compensation item as bonus, those skilled in the art with the benefit of this disclosure will appreciate that other types of compensation items (e.g., commission) in the gross wage may be associated with similar adjusted ranges and rules configured in the proactive payroll support tool.

Figure 3D:
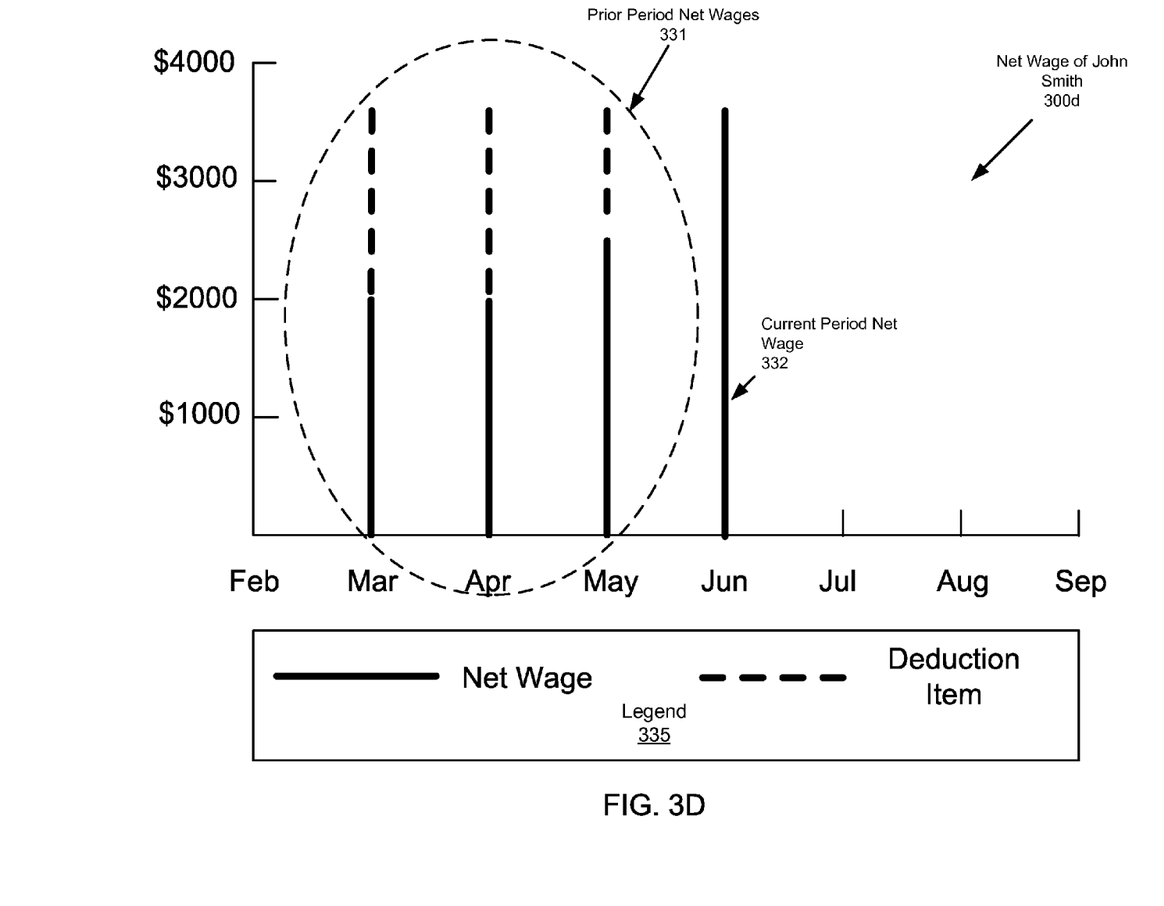

FIG. 3D shows a chart of net wage for employee John Smith (300d) charting the payroll component "net wage" based on the most recent four monthly payrolls (i.e., March through June) where the current value of payroll component is the current period net wage (332) (i.e., John Smith's net wage for June). In particular, the net wage is shown to be associated with a deduction item shown by a legend (335) shown in FIG. 3D. In the example shown in FIG. 3D, the irregularity parameter is a type of the deduction item. For example, the type of the deduction item may be a social security tax, a personal tax withholding, etc. Further, the value range of payroll component "net wage" is determined based on three consecutive prior payroll periods. As shown, John's net wages are $2000 for March, $2000 for April, and $2500 for May within the prior period net wages (331) resulting in a value range of the net wage calculated to be $2000 to $2500. The net wage of $3600 for the current month of June (i.e., the current period net wage (332)) lies outside of this calculated value range by a difference of $1100, which is more than a pre-determined threshold of 10 percent of the spread (i.e., $2500−$2000=$500) in value range (i.e., $2000 to $2500), thus a possible payroll error is indicated. The rule associated with the payroll component "net wage" dictates that a type of deduction item need to be examined to confirm whether the payroll error does exist.

Based on an automatic analysis by the proactive payroll support tool, a determination is made that the deduction item is social security tax and the associated rule dictates that a cumulative gross wage up to the current payroll period within the tax year must be compared to a social security wage limit set by the government. In particular, the social security tax deduction is no longer required when the cumulative gross wage exceeds the social security wage limit. Said differently, the adjusted range of social security tax deduction is 0 if the cumulative gross wage up to the current payroll period for the particular tax year exceeds the designated social security wage limit.

In the example shown in FIG. 3D, the cumulative gross wage from January to June is calculated automatically and actually exceeds the government required social security tax limit. Because the social security tax is no longer required to be deducted from the gross wage for the June payroll, a determination is automatically made by the proactive payroll support tool that there is no error in the current payroll. Therefore, no alert is generated for manual problem resolution and the June payroll is release as-is.

Although the example described above relates to the type of deduction item as social security tax, those skilled in the art with the benefit of this disclosure will appreciate that other types of deduction item (e.g., personal tax withholding) associated with the net wage may be associated with similar rules configured in the proactive payroll support tool. For example, the rule associated with personal tax withholding may dictate that an employee elected withholding amount be identified and correlated to the net wage difference between the current period payroll and the prior period payrolls. Specifically, if the employee has changed a dollar amount in the elected withholding, the same amount is to be separated from the total net wage difference when comparing to the threshold for detecting possible payroll error.

Although the example payroll components described in reference to FIGS. 3A-3D above relate to an individual employee, the payroll component may relate to multiple employees, groups of employees (i.e., division of company, classification of employees such as part-time, full-time, contract, etc.), or even companies. It is also contemplated that the payroll component and/or the associated rule for analyzing detected payroll component difference may be customized to a particular company, employee, or a set of employees.

Assuming that an employer's payroll of all employees in total are normally under $50,000 per payday, the employer only needs to make tax deposits monthly. In one or more embodiments of the invention, the proactive payroll support tool monitors employer's payrolls regularly to see whether the amount is exceeding $50,000 for any given payday. If the amount exceeds $50,000 in a current payroll, the proactive payroll support tool automatically changes employer's tax deposit frequency from monthly to bi-weekly and sends an electronic notification to the employer in accordance with one or more embodiments of the invention. In one or more embodiments of the invention, the proactive payroll support tool continues to monitor employer's payrolls on a regular basis to determine whether the amount is reduced back under $50,000. If employer's payroll falls below $50,000, the proactive payroll support tool automatically changes employer's tax deposit frequency back to bi-weekly and sends an electronic notification to the employer.

In one or more embodiments of the invention, the employer's payroll is processed using an online payroll system provided/managed by a third party payroll service provider. In this context, the employer is referred to as a client to the third party payroll service provider and the employer's payroll is referred to as client payroll. In such embodiments, an automated task (e.g., a monitor task launched by the proactive payroll support tool) is added to an online payroll system that reviews client payroll data on a specified frequency (e.g., daily) and determines whether any potential payroll error conditions arise (e.g., payroll exceeding the aforementioned $50,000 limit). The monitor task communicates any detected potential payroll error condition to the proactive payroll support tool, which in turn alerts a payroll support representative of the client regarding the potential payroll error. Accordingly, the client payroll support representative reviews the payroll data and confirms whether the automatically detected potential payroll error condition relates to actual payroll errors or not. If confirmed to be an actual payroll error, the proactive payroll support tool performs a pre-set, automated correction (e.g., change tax deposit frequency to semi-weekly if payroll amount exceeds $50,000).

Figure 4:
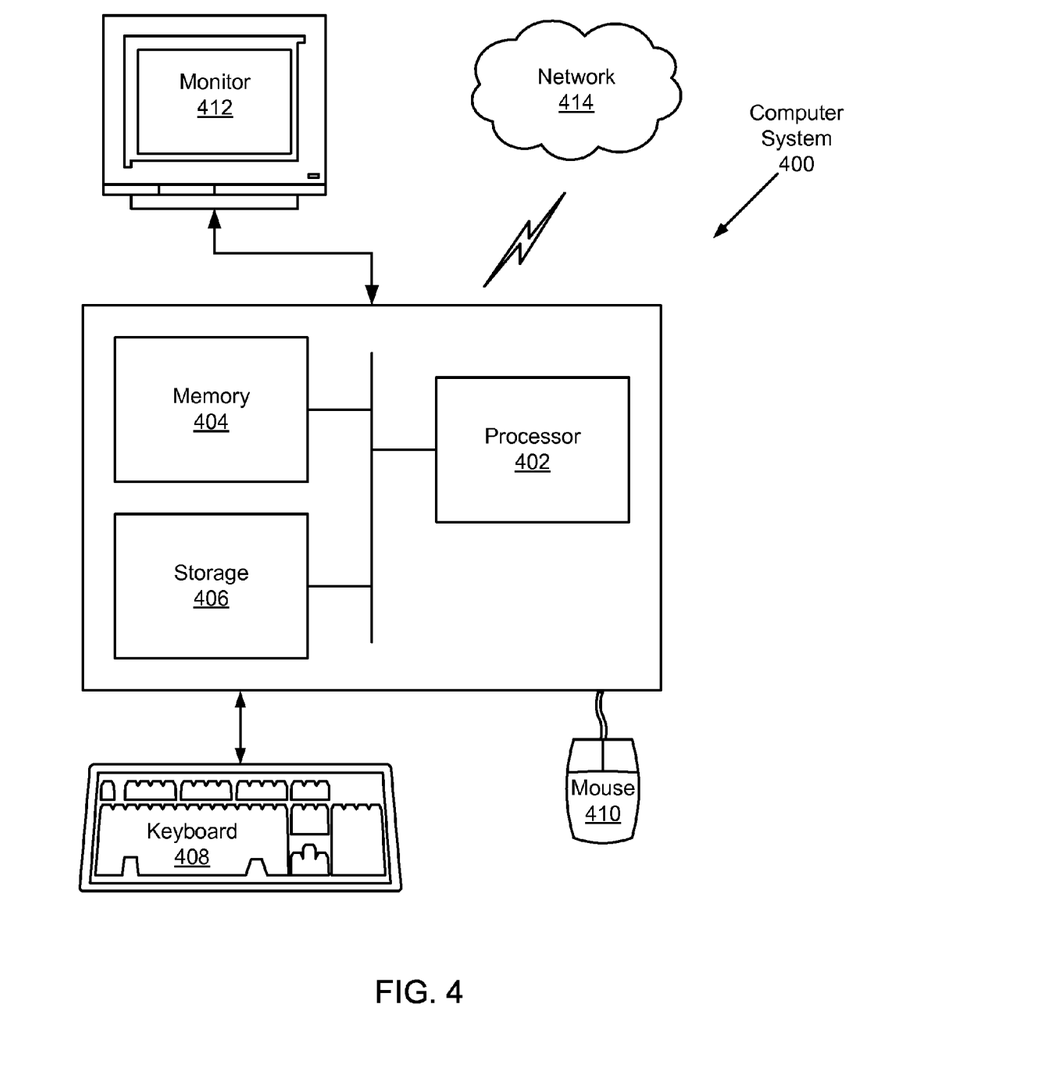
FIG. 4 shows a diagram of a computer in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various elements of the computer system (120), the repository (130), etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, a magnetic disk, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for correcting a payroll error in a payroll of an employee, comprising:
calculating, using a processor of a server computer via a proactive payroll support tool, a first value range of a payroll component based on the payroll of the employee for a pre-determined number of prior payroll periods, wherein the payroll component comprises a plurality of work hours;
comparing, using the proactive payroll support tool, a current value of the payroll component for a current payroll period and the first value range to generate a first difference;
retrieving an irregularity parameter associated with the payroll component in response to the first difference exceeding a pre-determined first threshold, wherein the irregularity parameter relates to a pre-determined mechanism capable of causing the payroll error, wherein the irregularity parameter comprises a time period that a current position is held by the employee;
analyzing, using the proactive payroll support tool, the first difference using a pre-determined rule based on the irregularity parameter to determine whether a suspected payroll error exists, wherein the analyzing comprises:
determining a predicted value range of the plurality of work hours based on the time period that the current position is held by the employee, a job assignment classification of the employee, an algorithm that considers standard deviation and historical minimum and maximum of payroll component values, an algorithm that considers statistical patterns based on historical data, and statistics of work hours of a plurality of employees separate from the employee,
further comparing the current value of the payroll component for the current payroll period with the predicted value range to generate a second difference, and
determining that the payroll error exists when the second difference exceeds a pre-determined second threshold; and
in response to determining that the payroll error exists, correcting the payroll error prior to releasing the payroll for the current payroll period.

2. The method of claim 1,
wherein the payroll component further comprises a plurality of overtime hours,
wherein the irregularity parameter further comprises an allocation between the plurality of overtime hours and a plurality of regular hours, and
wherein analyzing the first difference using the pre-determined rule further comprises:
analyzing the allocation between the plurality of overtime hours and the plurality of regular hours based on a pre-determined overtime allocation rule to identify an allocation error, and
determining that the payroll error exists in response to identifying the allocation error.

3. The method of claim 1,
wherein the payroll component further comprises a gross wage consisting of a plurality of compensation items,
wherein the irregularity parameter further comprises a type of a compensation item of the plurality of compensation items, and
wherein analyzing the first difference using the pre-determined rule further comprises:
identifying the type of the compensation item as a bonus,
determining a third value range and a third threshold of the bonus based on a pre-determined bonus rule,
comparing a current amount of the bonus for the current payroll period with the third value range to generate a third difference, and
determining that the payroll error exists when the third difference exceeds the third threshold.

4. The method of claim 1,
wherein the payroll component further comprises a gross wage consisting of a plurality of compensation items,
wherein the irregularity parameter further comprises a type of a compensation item of the plurality of compensation items, and
wherein analyzing the first difference using the pre-determined rule further comprises:
identifying the type of the compensation item as a commission,
determining a third value range and a third threshold of the commission based on a pre-determined commission rule,
comparing a current amount of the commission for the current payroll period with the third value range to generate a third difference, and
determining that the payroll error exists when the third difference exceeds the third threshold.

5. A system for correcting a payroll error in a payroll of an employee, comprising:
a processor; and
a payroll change calculator executing on the processor via a proactive payroll support tool and configured to:
calculate a first value range of a payroll component based on the payroll of the employee for a pre-determined number of prior payroll periods, wherein the payroll component comprises a plurality of work hours, and
compare a current value of the payroll component for a current payroll period and the first value range to generate a first difference;
a payroll difference analyzer executing on the processor via a proactive payroll support tool and configured to:
retrieve an irregularity parameter associated with the payroll component in response to the first difference exceeding a pre-determined first threshold, wherein the irregularity parameter relates to a pre-determined mechanism capable of causing the payroll error, wherein the irregularity parameter comprises a time period that a current position is held by the employee, and
analyze the first difference using a pre-determined rule based on the irregularity parameter to determine whether the payroll error exists, wherein the analyzing comprises:
determine a predicted value range of the plurality of work hours based on the time period that the current position is held by the employee, a job assignment classification of the employee, an algorithm that considers standard deviation and historical minimum and maximum of payroll component values, an algorithm that considers statistical patterns based on historical data, and statistics of work hours of a plurality of employees separate from the employee, further compare the current value of the payroll component for the current payroll period with the predicted value range to generate a second difference, and determine that the payroll error exists when the second difference exceeds a pre-determined second threshold; and a payroll correction tool executing on the processor and configured to:

in response to determining that a suspected payroll error exists, correct the payroll error prior to releasing the payroll for the current payroll period.

6. The system of claim 5, further comprising:
a repository operatively coupled to the processor and configured to store the payroll of the employee comprising the payroll component.

7. The system of claim 6, the repository further configured to store the first value range, the first threshold, the irregularity parameter, and the pre-determined rule.

8. The system of claim 5,
wherein the payroll component further comprises a plurality of overtime hours,
wherein the irregularity parameter further comprises an allocation between the plurality overtime hours and a plurality of regular hours, and
wherein analyzing the first difference using the pre-determined rule further comprises:
analyzing the allocation between the plurality of overtime hours and the plurality of regular hours based on a pre-determined overtime allocation rule to identify an allocation error, and
determining that the payroll error exists in response to identifying the allocation error.

9. The system of claim 5,
wherein the payroll component further comprises a gross wage consisting of a plurality of compensation items,
wherein the irregularity parameter further comprises a type of a compensation item of the plurality of compensation items, and
wherein analyzing the first difference using the pre-determined rule further comprises:
identifying the type of the compensation item as a bonus,
determining a third value range and a third threshold of the bonus based on a pre-determined bonus rule,
comparing a current amount of the bonus for the current payroll period with the third value range to generate a third difference, and
determining that the payroll error exists when the third difference exceeds the third threshold.

10. The system of claim 5,
wherein the payroll component further comprises a gross wage consisting of a plurality of compensation items,
wherein the irregularity parameter further comprises a type of a compensation item of the plurality of compensation items, and
wherein analyzing the first difference using the pre-determined rule further comprises:
identifying the type of the compensation item as a commission,
determining a third value range and a third threshold of the bonus based on a pre-determined commission rule,
comparing a current amount of the commission for the current payroll period with the third value range to generate a third difference, and
determining that the payroll error exists when the third difference exceeds the third threshold.

11. A non-transitory computer readable storage medium embodying instructions executable by a computer to correct a payroll error in a payroll of an employee via a proactive payroll support tool, the instructions, when executed by the computer comprising functionality for:

calculating a first value range of a payroll component based on the payroll of the employee for a pre-determined number of prior payroll periods, wherein the payroll component comprises a plurality of work hours;

comparing a current value of the payroll component for a current payroll period and the first value range to generate a first difference;

retrieving an irregularity parameter associated with the payroll component in response to the first difference exceeding a pre-determined first threshold, wherein the irregularity parameter relates to a pre-determined mechanism capable of causing the payroll error, wherein the irregularity parameter comprises a time period that a current position is held by the employee;

analyzing, using the processor, the first difference using a pre-determined rule based on the irregularity parameter to determine whether a suspected payroll error exists, wherein the analyzing comprises:

determining a predicted value range of the plurality of work hours based on the time period that the current position is held by the employee, a job assignment classification of the employee, an algorithm that considers standard deviation and historical minimum and maximum of payroll component values, an algorithm that considers statistical patterns based on historical data, and statistics of work hours of a plurality of employees separate from the employee, further comparing the current value of the payroll component for the current payroll period with the predicted value range to generate a second difference, and determining that the payroll error exists when the second difference exceeds a pre-determined second threshold; and in response to determining that the payroll error exists, correcting the payroll error prior to releasing the payroll for the current payroll period.

12. The computer readable storage medium of claim 11,
wherein the payroll component further comprises a plurality of overtime hours,
wherein the irregularity parameter further comprises an allocation between the plurality overtime hours and a plurality of regular hours, and
wherein analyzing the first difference using the pre-determined rule further comprises:
analyzing the allocation between the plurality of overtime hours and the plurality of regular hours based on a pre-determined overtime allocation rule to identify an allocation error, and
determining that the payroll error exists in response to identifying the allocation error.

13. The computer readable storage medium of claim 11,
wherein the payroll component further comprises a gross wage consisting of a plurality of compensation items,
wherein the irregularity parameter further comprises a type of a compensation item of the plurality of compensation items, and
wherein analyzing the first difference using the pre-determined rule further comprises:

identifying the type of the compensation item as a bonus,
determining a third value range and a third threshold of the bonus based on a pre-determined bonus rule,
comparing a current amount of the bonus for the current payroll period with the third value range to generate a third difference, and
determining that the payroll error exists when the third difference exceeds the third threshold.

14. The computer readable storage medium of claim 11,
wherein the payroll component further comprises a gross wage consisting of a plurality of compensation items,
wherein the irregularity parameter further comprises a type of a compensation item of the plurality of compensation items, and
wherein analyzing the first difference using the pre-determined rule further comprises:
  identifying the type of the compensation item as a commission,
  determining a third value range and a third threshold of the bonus based on a pre-determined commission rule,
  comparing a current amount of the commission for the current payroll period with the third value range to generate a third difference, and
  determining that the payroll error exists when the third difference exceeds the third threshold.

15. The method of claim 1,
wherein the first value range comprises a pre-determined number of standard deviations of a statistical distribution of the plurality of work hours, and
wherein the job assignment classification comprises at least one selected from a group consisting of a temporary employee and a permanent employee.

16. The system of claim 5,
wherein the first value range comprises a pre-determined number of standard deviations of a statistical distribution of the plurality of work hours, and
wherein the job assignment classification comprises at least one selected from a group consisting of a temporary employee and a permanent employee.

17. The computer readable storage medium of claim 11,
wherein the first value range comprises a pre-determined number of standard deviations of a statistical distribution of the plurality of work hours, and
wherein the job assignment classification comprises at least one selected from a group consisting of a temporary employee and a permanent employee.

\* \* \* \* \*

UNITED STATES PATENT AND TRADEMARK OFFICE
CERTIFICATE OF CORRECTION

Page 1 of 1

PATENT NO. : 9,978,098 B1
APPLICATION NO. : 12/871793
DATED : May 22, 2018
INVENTOR(S) : Lesley Kim Grossblatt et al.

It is certified that error appears in the above-identified patent and that said Letters Patent is hereby corrected as shown below:

In the Claims

Claim 8, Column 15, Line 25, the word "of" should be added between the words "plurality" and "overtime".

Claim 12, Column 16, Line 50, the word "of" should be added between the words "plurality" and "overtime".

Signed and Sealed this
Fourth Day of June, 2019

Andrei Iancu
*Director of the United States Patent and Trademark Office*